(12) United States Patent
Fang (10) Patent No.: US 8,621,252 B2
(45) Date of Patent: Dec. 31, 2013

(54) POWER MANAGEMENT METHOD AND APPARATUS, AND POWER SUPPLY SYSTEM

(75) Inventor: Qingyin Fang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 74 days.

(21) Appl. No.: 13/211,801

(22) Filed: Aug. 17, 2011

(65) Prior Publication Data

US 2011/0302435 A1  Dec. 8, 2011

Related U.S. Application Data

(63) Continuation of application No. PCT/CN2009/070445, filed on Feb. 17, 2009.

(51) Int. Cl.
*G06F 1/26* (2006.01)

(52) U.S. Cl.
USPC .......................................... 713/320

(58) Field of Classification Search
USPC .......................................... 713/320
See application file for complete search history.

(56) References Cited

U.S. PATENT DOCUMENTS

| | | | |
|---|---|---|---|
| 5,652,893 A * | 7/1997 | Ben-Meir et al. | 713/310 |
| 6,925,583 B1 | 8/2005 | Khu et al. | |
| 2004/0130944 A1 | 7/2004 | Krause et al. | |
| 2005/0055587 A1* | 3/2005 | Lee | 713/300 |
| 2006/0242438 A1 | 10/2006 | Baba et al. | |
| 2007/0300046 A1 | 12/2007 | Alfano et al. | |
| 2008/0077817 A1* | 3/2008 | Brundridge et al. | 713/340 |
| 2009/0144567 A1* | 6/2009 | Cui et al. | 713/300 |
| 2009/0307514 A1* | 12/2009 | Roberts et al. | 713/330 |

FOREIGN PATENT DOCUMENTS

| | | |
|---|---|---|
| CN | 1474272 | 2/2004 |
| CN | 1673913 A | 9/2005 |
| CN | 1719917 | 1/2006 |
| CN | 1967963 | 5/2007 |
| CN | 101150450 | 3/2008 |
| CN | 101154096 A | 4/2008 |
| CN | 101154184 | 4/2008 |
| EP | 0 636 976 A1 | 2/1995 |
| JP | 2000-101580 | 4/2000 |

OTHER PUBLICATIONS

International Search Report from P.R. China in International Application No. PCT/CN2009/070445, mailed Nov. 26, 2009.
Written Opinion of the International Search Authority related to International Application No. PCT/CN2009/070445; mailed on Nov. 26, 2009, for Huawei Technologies Co., Ltd.

(Continued)

*Primary Examiner* — Kim Huynh
*Assistant Examiner* — Alyaa T Mazyad
(74) *Attorney, Agent, or Firm* — Conley Rose, P.C.; Grant Rodolph; Nicholas K. Beaulieu (57) ABSTRACT

A power management method and apparatus, and a power supply system are provided. The method includes: obtaining a power demand value of each module and a rated output power of each power supply unit (PSU) in a communication equipment; calculating the obtained power demand value of each module to acquire a total power demand value of the modules; and adjusting, according to the calculated total power demand value of the modules and the obtained rated output power of each PSU, the current number of the PSUs actually turned on in the communication equipment.

18 Claims, 6 Drawing Sheets

(56) References Cited

OTHER PUBLICATIONS

Foreign Communication From a Counterpart Application, Chinese Application 200980155903.4, Chinese Office Action dated Feb. 27, 2013, 7 pages.
Foreign Communication From a Counterpart Application, Chinese Application 200980155903.4, Partial Translation of Chinese Office Action dated Feb. 27, 2013, 10 pages.
Foreign Communication From a Counterpart Application, Chinese Application No. 200980155903.4, Chinese Office Action dated Aug. 16, 2013, 6 pages.
Foreign Communication From a Counterpart Application, Chinese Application No. 200980155903.4, Partial English Translation of Chinese Office Action dated Aug. 16, 2013, 9 pages.
Foreign Communication From a Counterpart Application, Chinese Application No. 200980155903.4, Chinese Search Report dated Aug. 8, 2013, 2 pages.

* cited by examiner

POWER MANAGEMENT METHOD AND APPARATUS, AND POWER SUPPLY SYSTEM

CROSS-REFERENCE TO RELATED APPLICATIONS

This application is a continuation of International Application No. PCT/CN2009/070445, filed on Feb. 17, 2009, which is hereby incorporated by reference in its entirety.

FIELD OF THE INVENTION

The present invention relates to the field of communication, and in particular, to a power management method and apparatus, and a power supply system.

BACKGROUND OF THE INVENTION

At present, since complexity and power consumption of hardware in communication equipment become higher and higher, operation costs and maintenance costs of the communication equipment become higher and higher accordingly, and improvement of energy efficiency of the communication equipment is an effective measure for reducing the power consumption. As the data shows, the energy efficiency of a power supply unit (Power supply unit, PSU) of the communication equipment is closely related to the practical load of the PSU, and specifically, when the practical load is lower than a certain value (for example, 30% of the full load), a large part of the input power is converted into useless heat consumption, thereby greatly reducing the energy efficiency of the PSU. Therefore, for the PSU of the communication equipment, an effective approach of improving the energy efficiency of the PSU of the communication equipment is to turn off a part of the PSUs that are currently not needed, and dynamically adjust the PSUs of the communication equipment.

The method in the prior art is as follows. A power management unit (power management unit, PMU) is added in the communication equipment, and each PSU of the communication equipment is dynamically controlled by the PMU. Specifically, the PMU communicates with each PSU module through a bus, so as to obtain the state and power of the PSU module, and then perform shutdown control on the PSU according to the operation of load in the communication equipment.

The current number of the PSUs at the working state is calculated on the basis of the power condition of the current loads of the communication equipment, and when a board is newly inserted in the communication equipment, the newly inserted board instantly consumes the power of each PSU module at the working state in the communication equipment, and at this time, the power supply capability of each PSU at the working state does not change. Therefore, sudden power demands are unable to be predicted for the power supply capability of the communication equipment, thereby causing power supply accidents due to insufficient supply power of the each PSU at the working state.

SUMMARY OF THE INVENTION

Embodiments of the present invention provide a power management method and apparatus, and a power supply system, so as to adjust, according to a power demand value of each module and a rated output power of each PSU in the communication equipment, the number of PSUs currently required to be turned on in the communication equipment, thereby avoiding power supply accidents due to insufficient power of the PSU at the working state.

An embodiment of the present invention provides a power management method, where the method includes:
obtaining a power demand value of each module and a rated output power of each PSU in a communication equipment;
calculating the obtained power demand value of each module to acquire a total power demand value of the communication equipment; and
adjusting, according to the calculated total power demand value of the communication equipment and the obtained rated output power of each PSU, the current number of the PSUs actually turned on in the communication equipment.

An embodiment of the present invention further provides a power management apparatus, where the apparatus includes:
a system energy-saving controller, configured to obtain a power demand value of each module and a rated output power of each PSU in a communication equipment, calculate the obtained power demand value of each module to acquire a total power demand value of the communication equipment, and output the total power demand value of the communication equipment and the rated output power of each PSU to a power energy-saving control logical unit; and
the power energy-saving control logical unit, configured to adjust, according to the total power demand value of the communication equipment and the rated output power of each PSU output by the system energy-saving controller, the current number of the PSUs actually turned on in the communication equipment.

An embodiment of the present invention also provides a power supply system, where the system includes: a power management apparatus, modules and PSUs of a communication equipment. The power management apparatus is configured to manage the PSUs and the PSUs are configured to supply power to the modules.

The power management apparatus obtains a power demand value of each module and a rated output power of each PSU in the communication equipment, calculates the obtained power demand value of each module to acquire a total power demand value of the communication equipment, and adjusts, according to the total power demand value of the communication equipment and the rated output power of each PSU, the current number of the PSUs actually turned on in the communication equipment.

It can be seen from the foregoing technical solutions that, the number of the PSUs currently required to be turned on in the communication equipment may be determined according to the total power demand value of the communication equipment and the rated output power of each PSU, and then the current number of the PSUs actually turned on in the communication equipment is adjusted to the determined number of PSUs required to be turned on, so timely adjustment is achieved according to the demanded power of each module, thereby avoiding power supply accidents due to insufficient power of the PSUs at the working state.

BRIEF DESCRIPTION OF THE DRAWINGS

To illustrate the technical solutions according to the embodiments of the present invention or in the prior art more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention will be clearly described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

In a telecom equipment (Telecom Equipment), in order to ensure the reliability of the telecom equipment, an N+M backup power supply manner needs to be adopted in a power system (Power System) of the communication equipment. The N+M backup refers to that after the power supply system is disposed with N power supply modules capable of satisfying the telecom equipment, M power supply modules (redundancy backup) are further disposed, that is, N+M power supply modules are actually disposed. When a failure occurs in some power supply modules, the redundant power supply modules may still ensure normal power supply for the telecom equipment.

Embodiment 1

Figure 1:
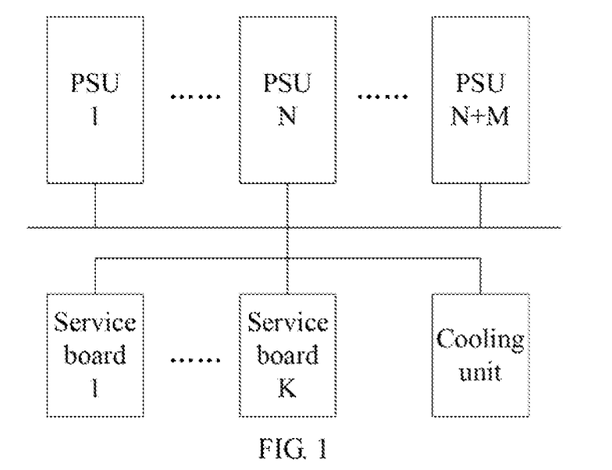
FIG. 1 is a schematic structural view of a power system in an N+M backup power supply manner.
Figure 2:
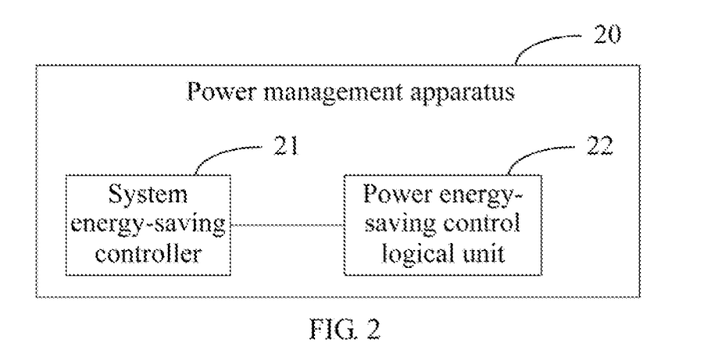
FIG. 2 is a schematic structural view of an apparatus according to Embodiment 1 of the present invention.

FIG. 2 is a schematic structural view of a power management apparatus according to an embodiment of the present invention.

Referring to FIG. 2, a power management apparatus 20 includes:

a system energy-saving controller 21, configured to obtain a power demand value of each module and a rated output power of each PSU in a communication equipment, calculate the obtained power demand value of each module to acquire a total power demand value of the communication equipment, and output the total power demand value of the communication equipment and the rated output power of each PSU to a power energy-saving control logical unit, where each module may be a board, or a board and a cooling unit, which does not affect the implementation of the embodiments of the present invention; and the power energy-saving control logical unit 22 is configured to adjust, according to the total power demand value of the communication equipment and the rated output power of each PSU output by the system energy-saving controller 21, the current number of the PSUs actually turned on in the communication equipment.

It can be seen from the above description that, the total power demand value of the communication equipment is obtained according to the power demand value of each module in the communication equipment, the number of the PSUs currently required to be turned on in the communication equipment may be determined according to the total power demand value of the communication equipment and the rated output power of each PSU, and then the current number of the PSUs actually turned on in the communication equipment is adjusted to the determined number of PSUs required to be turned on. Therefore, when a board is newly inserted in the communication equipment, the system energy-saving controller 21 first obtains the power demand of the board, and then obtains the total power demand value of the communication equipment. The power energy-saving control logical unit 22 may adjust, according to the total power demand value of the communication equipment and the rated output power of each PSU, the current number of the PSUs actually turned on in the communication equipment, thereby avoiding power supply accidents due to insufficient power of the PSUs at the working state.

Further, the power management apparatus 20 may timely adjust the operating number of the PSUs in the communication equipment according to the power demand value of each module, and the non-working PSUs in the communication equipment do not need to be turned on, thereby reducing the power consumption of the communication equipment and improving the energy efficiency.

The power energy-saving control logical unit 22 is a hardware logical device, such as a Complex Programmable Logic Device (Complex Programmable Logic Device, CPLD), an Electrically Programmable Logic Device (Electrically Programmable Logic Device, EPLD) or a Field Programmable Gate Array (Field Programmable Gate Array, FPGA), which does not affect the implementation of the embodiments of the present invention. Furthermore, the power energy-saving control logical unit 22 adopts hardware control logic, so the PSUs in the communication equipment can be rapidly turned on. Therefore, the redundancy backup PSUs may be timely turned on according to the total power demand value of the modules in the communication equipment, and the redundancy backup PSUs do not need to be kept on all the time, thereby reducing the power consumption of the communication equipment and improving the energy efficiency.

When each module includes a board and a cooling unit, the power energy-saving control logical unit 22 may judge the number of the PSUs which may be currently turned on or off according to a power demand register value of the board, a power demand register value of the cooling unit, and the rated output register power value of the PSU, and the number of the PSUs currently required to be turned on in the communication equipment may be obtained through the following formula:

$$N=(P_{board}+P_{cool})/P_{PSU},$$

where, N is the number of the PSUs currently required to be turned on in the communication equipment, $P_{board}$ is the total power demand value of the boards, $P_{cool}$ is the total power demand value of the cooling units, and $P_{PSU}$ is the rated output power of each PSU.

If the calculated N has decimal places, the decimal places are removed and the integral place is added by 1, that is, when $(P_{board}+P_{cool})/P_{PSU}$ is an integer, $N=(P_{board}+P_{cool})/P_{PSU}$; and when $(P_{board}+P_{cool})/P_{PSU}$ is not an integer, $N=(P_{board}+P_{cool})/P_{PSU}+1$.

When each module is a board, in this embodiment of the present invention, the power energy-saving control logical unit 22 of the power management apparatus may judge, according to the power demand register value of the board, and the rated output power register value of each PSU, the number of the PSUs which may be currently turned on and off, and the number of the PSUs currently required to be turned on in the communication equipment may be obtained through the following formula:

$$N=P_{board}/P_{PSU},$$

where the meanings of the parameters are the same as those described in the foregoing description, and if the calculated N has decimal places, the decimal places are removed and the integral place is added by 1, that is, when $P_{board}/P_{PSU}$ is an integer, $N=P_{board}/P_{PSU}$; and when $P_{board}/P_{PSU}$ is not an integer, $N=P_{board}/P_{PSU}+1$.

The system energy-saving controller 21 may be connected to the power energy-saving control logical unit 22 through a bus, and the bus may be a parallel bus, such as a local bus (local bus), an Industry Standard Architecture (Industry Standard Architecture: ISA) or a Peripheral Component Interconnect (Peripheral Component Interconnect, PCI) bus, or the bus may also be a serial bus, such as a Universal Asynchronous Receiver/Transmitter (Universal Asynchronous Receiver/Transmitter, UART) bus, an I2C (Inter-Integrated Circuit) bus, a RS232 (Recommended Standard 232) bus, an RS485 bus or a Serial Peripheral interface (Serial Peripheral interface, SPI) bus, which does not affect the implementation of the embodiments of the present invention.

Figure 3:
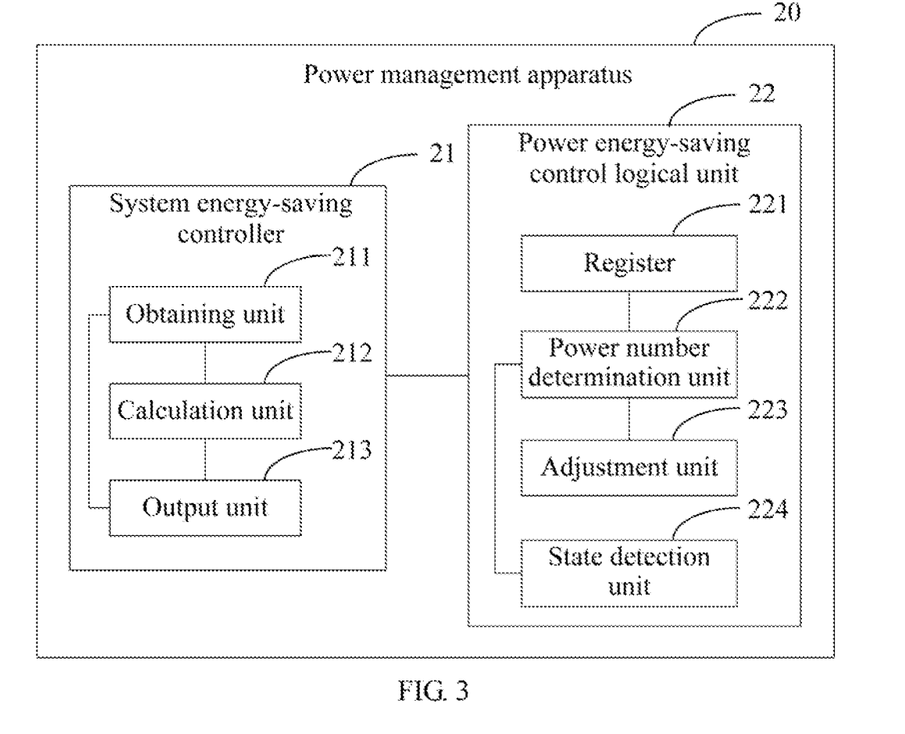
FIG. 3 is another schematic structural view of an apparatus according to Embodiment 1 of the present invention.

Referring to FIG. 3, it is another schematic structural view of a power management apparatus according to an embodiment of the present invention. The system energy-saving controller 21 may include:

an obtaining unit 211, configured to obtain a power demand value of each module and a rated output power of each PSU in a communication equipment;

a calculation unit 212, configured to calculate the power demand value of each module obtained by the obtaining unit 211 to obtain the total power demand value of the communication equipment; and an output unit 213, configured to output the total power demand value of the communication equipment obtained by the calculation unit 212 and the rated output power of each PSU in the system obtained by the obtaining unit 211 to a power energy-saving control logical unit 22.

The output unit 213 may control each module, and specifically, the output unit 213 may control power-on of the board or control the cooling unit to increase a rotation speed of the cooling unit.

The power energy-saving control logical unit 22 may include:

a register 221, configured to store the total power demand value of the communication equipment and the rated output power of each PSU output by the output unit 213 of the system energy-saving controller 21;

a power number determination unit 222, configured to determine, according to the total power demand value of the communication equipment and the rated output power of each PSU stored in the register 221, the number of the PSUs currently required to be turned on in the communication equipment; and an adjustment unit 223, configured to adjust the number of the PSUs required to be turned on in the communication equipment to the number of PSUs required to be turned on determined by the power number determination unit 222.

Furthermore, the power energy-saving control logical unit 22 may judge a state signal of in-position, normal working or a failure of each module and PSU in the communication equipment.

Therefore, the power energy-saving control logical unit 22 may further include:

a state detection unit 224, configured to detect the state signal of in-position, normal working or the failure of each module or PSU in the communication equipment.

The state detection unit 224 may detect the state signal once in 1 μs, and the detection interval may also be adjusted according to the practical conditions, which do not affect the implementation of the embodiments of the present invention.

Furthermore, the adjustment unit 223 is further configured to control, according to the signal detected by the state detection unit 224, the turn-on and turn-off of each PSU.

For example, when the state detection unit 224 detects that a failure occurs in a normally working PSU or a PSU is pulled out, the adjustment unit 223 instantly turns on another PSU currently in a sleep or off state. This action may be completed in a time shorter than 1 ms, so as to ensure that the switching procedure does not affect the power supply for the communication equipment.

When a new board or a cooling unit is inserted, the state detection unit 224 detects that an in-position signal of the board or the cooling unit changes, and then communicates with the system energy-saving controller 21 through a bus to request to obtain the power demand of the board or the cooling unit.

Figure 5:
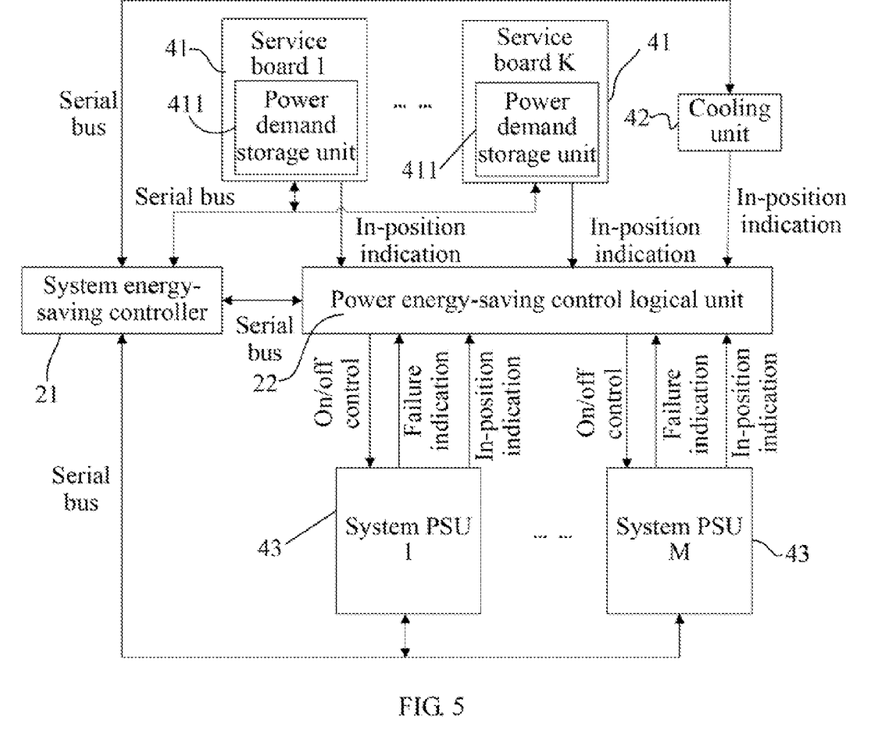
FIG. 5 is a detailed schematic structural view of a system according to Embodiment 2 of the present invention.

A power demand storage unit of each board in the communication equipment stores the power demand value of the board. As shown in FIG. 5, a power demand storage unit 411 is set in the board 41, the power demand storage unit 411 stores the power demand value of the board 41, and the board 41 and the power demand storage unit 411 are separately powered on. When the board 41 is inserted, the power demand storage unit 411 may be powered on, so the system energy-saving controller 21 may obtain the power demand of the board 41 from the power demand storage unit 411, and then obtain the total power demand of the communication equipment. The power energy-saving control logical unit 22 may adjust, according to the total power demand value of the communication equipment and the rated output power of each PSU, the current number of the PSUs actually turned on in the communication equipment, and eventually, the board 41 is controlled to be powered on through the output unit 213 of the system energy-saving controller 21.

It should be noted that, when the board 41 is inserted in a subrack, the load part of the board is not directly powered on. The power demand storage unit 411 of the board is read through the serial bus (the power supply of the memory is separated from other parts of the board, and as long as the board is inserted in the subrack, the power demand memory of the board can be powered on), and the system energy-saving controller 21 may obtain the power demand value of the board.

When the system energy-saving controller obtains the power demand of the board, the system energy-saving controller may also establish and maintain a corresponding relation table of a type and a power demand of a board. When the board is inserted, the system energy-saving controller obtains the type of the board through the serial bus or an Input/Output (Input/Output, IO) signal, and searches in the foregoing corresponding relation table of the type and the power demand of the board according to the type to obtain the power demand of the board.

If the board or the cooling unit is pulled out, the state detection unit 224 detects that the in-position signal of the board or the cooling unit changes, and communicates with the system energy-saving controller 21 through the bus, so the system energy-saving controller 21 obtains and calculates the total power demand of the communication equipment again, and then writes the new total power demand into the register 221 inside the power energy-saving control logical unit 22. The power energy-saving control logical unit 22 may adjust, according to the total power demand of the communication equipment and the rated output power of each PSU, the current number of the PSUs actually turned on in the communication equipment.

It should be noted that, the system energy-saving controller 21 may be designed with software, where, the obtaining unit 211, the calculation unit 212, and the output unit 213 of the system energy-saving controller 21 are divided according to function modules, and of course, more modules or different modules may also be divided, for example, the calculation unit 212 may be included in the power energy-saving control logical unit 22, so the calculation unit 212 may be designed with hardware, and the embodiments of the present invention are not limited in this aspect.

It should be understood that, the PSUs in the foregoing embodiment may also support a multi-partition case. That is, the PSU in a certain partition of the communication equipment supplies power to each module in this partition, while the PSU in another partition supplies power to each module in the corresponding partition, and the system energy-saving controller 21 and the power energy-saving control logical unit 22 may separately and independently control each partition on the basis of the foregoing control principles, which does not affect the implementation of the embodiments of the present invention.

In the embodiment of the present invention, the system energy-saving controller 21 and the power energy-saving control logical unit 22 in the power management device may be integrated or separately deployed.

It can be seen from the foregoing description that, the number of the PSUs currently required to be turned on in the communication equipment may be determined according to the total power demand value of the communication equipment and the rated output power of each PSU, and then the current number of the PSUs actually turned on in the communication equipment is adjusted to the determined number of PSUs required to be turned on, so timely adjustment is achieved according to the demanded power of each module, thereby avoiding power supply accidents due to insufficient power of the PSUs at the working state.

Furthermore, the power management apparatus 20 may be implemented through hardware control logic, and PSUs in the communication equipment are controlled through the hardware control logic, thereby improving the system energy efficiency and reducing the energy consumption.

Embodiment 2

Figure 4:
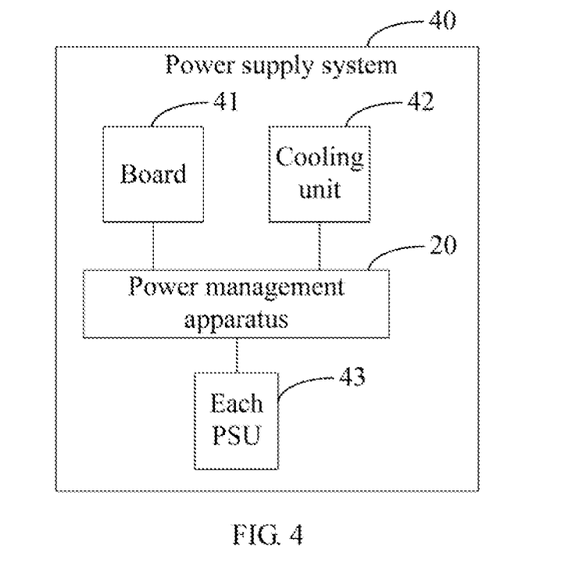
FIG. 4 is a schematic structural view of a system according to Embodiment 2 of the present invention.

FIG. 4 is a schematic structural view of a power supply system according to an embodiment of the present invention.

A power supply system 40 is applied in a communication equipment, and the power supply system 40 includes a power management apparatus 20, modules, and PSUs 43, where the power management apparatus 20 is configured to manage the PSUs 43, and the PSUs 43 are configured to supply power to the modules.

The power management apparatus 20 obtains a power demand value of each module and a rated output power of each PSU 43 in the communication equipment, calculates the obtained power demand value of each module to acquire a total power demand value of the communication equipment, and adjusts, according to the total power demand value of the communication equipment and the rated output power of each PSU, the current number of the PSUs actually turned on in the communication equipment.

It can be seen from the above that, the number of the PSUs currently required to be turned on in the communication equipment may be adjusted according to the total power demand value of the communication equipment and the rated output power of each PSU. Therefore, when a board is newly inserted in the communication equipment, the power management apparatus 20 first obtains the power demand of the board, then obtains the total power demand value of the communication equipment, and adjusts, according to the total power demand value of the communication equipment and the rated output power of each PSU, the current number of the PSUs actually turned on in the communication equipment, thereby avoiding power supply accidents due to insufficient power of the PSU at the working state.

The power management apparatus 20 may obtain the power demand value of each module in the communication equipment and the rated output power of each PSU 43 through a serial bus.

Furthermore, the power management apparatus 20 may control the modules through the serial bus.

The serial bus may be, but not limited to, an I2C bus, an RS485 bus or an SPI bus, and a bus topology or point-to-point topology structure may exist between the power management apparatus 20 and the modules, the PSUs 43, which do not affect the implementation of the embodiments of the present invention.

Furthermore, referring to FIGS. 3 and 5 continuously, the power management apparatus 20 includes a system energy-saving controller 21 and a power energy-saving control logical unit 22.

The system energy-saving controller 21 is configured to obtain the power demand value of each module and the rated output power of each PSU in the communication equipment, calculate the obtained power demand value of each module to acquire a total power demand value of the communication equipment, and output the total power demand value of the communication equipment and the rated output power of each PSU to the power energy-saving control logical unit 22.

Referring to FIG. 5, each module may be the board 41 and the cooling unit 42. It can be understood that, each module may also be the board 41, and the embodiments of the present invention are not limited in this aspect.

The power energy-saving control logical unit 22 is configured to adjust, according to the total power demand value of the communication equipment and the rated output power of each PSU output by the system energy-saving controller 21, the current number of the PSUs actually turned on in the communication equipment.

The power energy-saving control logical unit 22 of the power management apparatus 20 may further detect a state signal of in-position, normal working or a failure of each module (which may include the board, or include the board and the cooling unit) and each PSU, and controls the turn-on and turn-off of each PSU according to the detected state signal.

In conclusion, it can be seen from the foregoing description that, the number of the PSUs currently required to be turned on in the communication equipment may be adjusted according to the total power demand value of the modules and the rated output power of each PSU, so timely adjustment is achieved according to the demanded power of each module, thereby avoiding power supply accidents due to insufficient power of the PSUs at the working state.

It should be noted that, in the foregoing embodiment, a register stores the total power demand of the communication equipment and the rated output power of each PSU, which is taken as an example for description, but the embodiments of the present invention are not limited to this case, and the register in this embodiment of the present invention may be considered as one of the storage units.

In the foregoing description, the power management apparatus and the power supply system are provided, and the embodiment of the present invention further provides a power management method.

Embodiment 3

Figure 6:
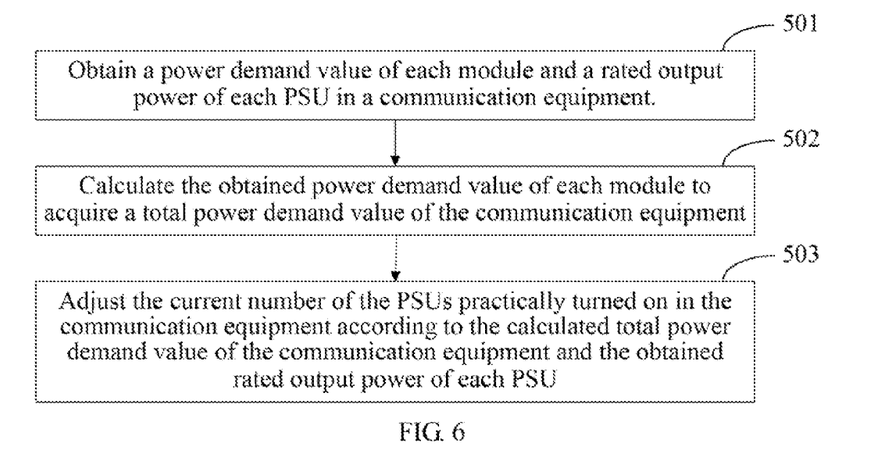
FIG. 6 is a schematic flowchart of a method according to Embodiment 3 of the present invention.

FIG. 6 is a schematic flow chart of a method according to an embodiment of the present invention. Referring to FIG. 6, the method includes the following steps.

In step 501, a power demand value of each module and a rated output power of each PSU in a communication equipment are obtained.

Said each module may be a board, or a board and a cooling unit, which does not affect the implementation of the embodiments of the present invention.

In this embodiment, the power management apparatus may be connected to the service boards, the cooling units, and the power supply units in the system through a serial bus, and obtains the corresponding power demand values and the rated output power.

The serial bus may be, but not limited to, an I2C bus, an RS485 bus or an SPI bus, and a bus topology or point-to-point topology structure may exist between the apparatus of the present invention and the modules, the cooling units, the system PSUs, which do not affect the implementation of the embodiments of the present invention.

In step 502, the obtained power demand value of each module is calculated to acquire a total power demand value of the communication equipment.

Steps 501 and 502 may be accomplished by the system energy-saving controller 21 of the power management apparatus 20 in this embodiment. The system energy-saving controller 21 outputs the obtained total power demand value of the communication equipment and the rated output power of each PSU to the power energy-saving control logical unit 22 of the power management apparatus.

In step 503, the current number of the PSUs actually turned on in the communication equipment is adjusted according to the calculated total power demand value of the communication equipment and the obtained rated output power of each PSU.

When the module includes a board and a cooling unit, the power energy-saving control logical unit 22 may judge, according to the power demand register values of the boards, the power demand register values of the cooling units, and the rated output power register values of the PSUs, the number of the PSUs which may be currently turned on or off, and the number of the PSUs currently required to be turned on in the communication equipment may be obtained through the following formula:

$$N=(P_{board}+P_{cool})/P_{PSU},$$

where, N is the number of the PSUs currently required to be turned on in the communication equipment, $P_{board}$ is the total power demand value of the boards, $P_{cool}$ is the total power demand value of the cooling units, and $P_{PSU}$ is the rated output power of each PSU.

If the calculated N has decimal places, the decimal places are removed and the integral place is added by 1, that is, when $(P_{board}+P_{cool})/P_{PSU}$ is an integer, $N=(P_{board}+P_{cool})/P_{PSU}$; and when $(P_{board}+P_{coil})/P_{PSU}$ is not an integer, $N=(P_{board}+P_{cool})/P_{PSU}+1$.

When each module is a board, in this embodiment of the present invention, the power energy-saving control logical unit 22 of the power management apparatus may judge, according to the power demand register values of the boards and the rated output power register values of the PSUs, the number of the PSUs which may be currently turned on and off, and the number of the PSUs currently required to be turned on in the communication equipment may be obtained through the following formula:

$$N=P_{board}/P_{PSU},$$

where, the meanings of the parameters are the same as those described in the foregoing description, and if the calculated N has decimal places, the decimal places are removed and the integral place is added by 1, that is, when $P_{board}/P_{PSU}$ is an integer, $N=P_{board}/P_{PSU}$; and when $P_{board}/P_{PSU}$ is not an integer, $N=P_{board}/P_{PSU}+1$.

Step 503 may be implemented through the power energy-saving control logical unit of the power management apparatus, and the power energy-saving control logical unit is a hardware logical device, such as a CPLD, an EPLD or an FPGA, which does not affect the implementation of the embodiments of the present invention.

It can be seen from the foregoing description that, the number of the PSUs currently required to be turned on in the communication equipment may be adjusted according to the total power demand value of the modules and the rated output power of each PSU, so timely adjustment is achieved according to the demanded power of each module, thereby avoiding power supply accidents due to insufficient power of the PSUs at the working state.

Furthermore, the power energy-saving control logical unit 22 adopts hardware control logic, so the PSUs in the communication equipment are rapidly turned on. Therefore, the redundancy backup PSUs may be timely turned on according to the total power demand value of the modules in the communication equipment, and the redundancy backup PSUs do not need to be kept on all the time, thereby reducing the power consumption of the communication equipment and improving the energy efficiency.

It should be understood that, the PSUs in the foregoing embodiment may also support a multi-partition case. That is, a PSU in a certain partition of the communication equipment supplies power to each module in this partition, while a PSU in another partition supplies power to each module in the corresponding partition, so the system energy-saving controller 21 and the power energy-saving control logical unit 22 may separately and independently control each partition on the basis of the foregoing control principles, which does not affect the implementation of the embodiments of the present invention.

In Embodiments 4 and 5, the processing flow of the power-on procedure of the communication equipment and the processing flow after changes of the state signals of the board, the cooling unit, and the power supply unit during normal work are detected are separately described. In Embodiment 4, the processing flow of the power management apparatus in the power-on procedure of the communication equipment is described, and in Embodiment 5, the processing flow of the power management apparatus after changes of the in-position information of the board, the cooling unit, and the power supply unit during the normal working procedure is described.

Embodiment 4

Figure 7:
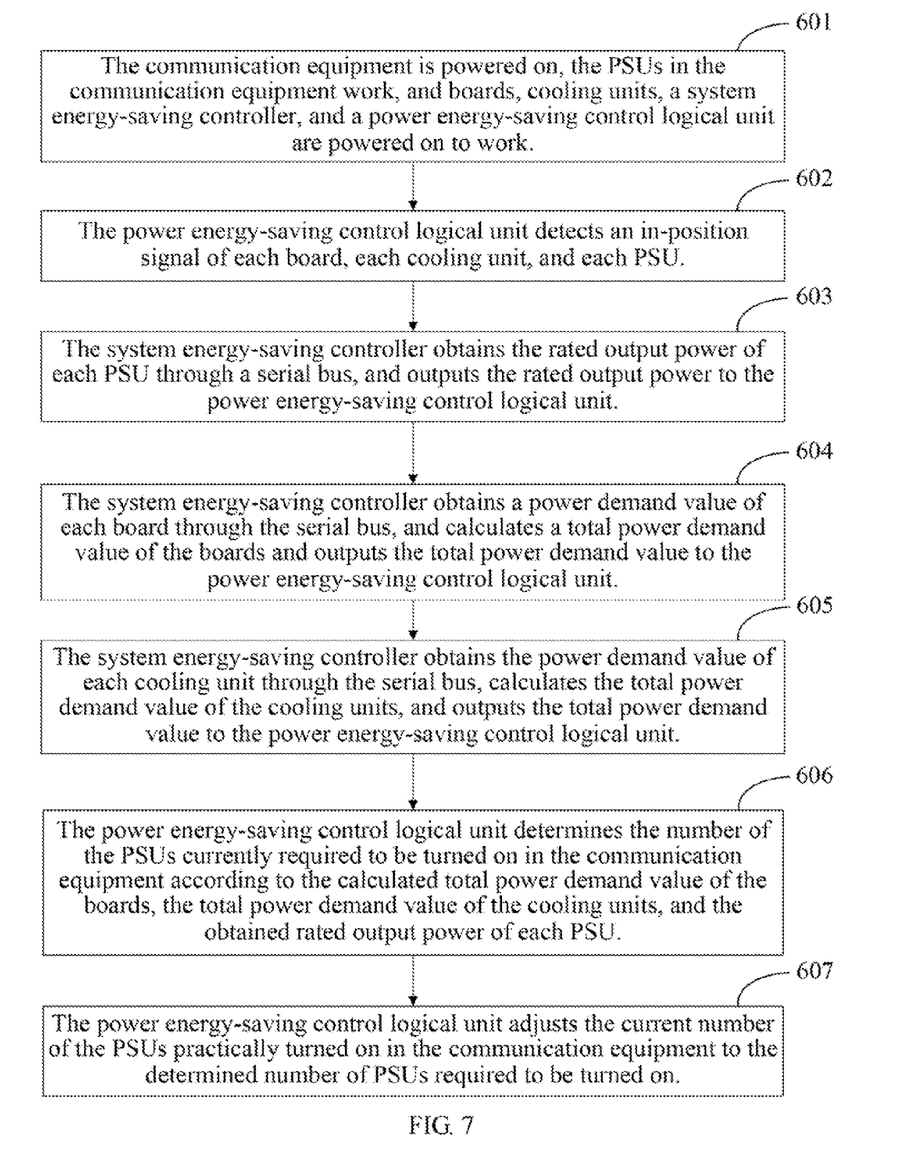
FIG. 7 is a schematic flowchart of a method according to Embodiment 4 of the present invention.

FIG. 7 is a schematic flow chart of a method according to an embodiment of the present invention. Referring to FIG. 7, the method includes the following steps.

In step 601, a communication equipment is power-on, PSUs of the communication equipment work, and boards, cooling units, a system energy-saving controller, and a power energy-saving control logical unit are powered on to work.

In step 602, the power energy-saving control logical unit detects in-position signals of each board, each cooling unit, and each PSU.

In step 603, the system energy-saving controller obtains the rated output power of each PSU through a serial bus, and outputs the rated output power to the power energy-saving control logical unit.

In step 604, the system energy-saving controller obtains a power demand value of each board through the serial bus, calculates a total power demand value of the boards, and outputs the total power demand value to the power energy-saving control logical unit.

It should be noted that, when the board is inserted in a subrack, a load part of the board is not directly powered on. A power demand storage unit of the board is read through the serial bus (the power supply for the memory is separated from other parts of the board, and as long as the board is inserted in the subrack, the power demand memory of the board can be powered on), and the system energy-saving controller may obtain the power demand value of the board.

Obviously, the method through which the system energy-saving controller obtains the power demand of the board by is not limited to the above method, and the system energy-saving controller may also establish and maintain a corresponding relation table of a type and a power demand of the board. When the board is inserted, the system energy-saving controller obtains the type of the board through the serial bus or an IO (Input/Output, IO) signal, and searches in the foregoing corresponding relation table of the type and the power demand of the board to obtain the power demand of the board.

In step 605, the system energy-saving controller obtains the power demand value of each cooling unit through the serial bus, calculates the total power demand value of the cooling units, and outputs the total power demand value to the power energy-saving control logical unit.

The cooling unit may be a fan, and since the change of the rotation speed of the fan may change the practical power consumption of the cooling unit, when the rotation speed of the fan increases, the system energy-saving controller may update the power demand register value of the cooling unit in the power energy-saving control logical unit through the serial bus. When the rotation speed of the fan decreases, the rotation speed of the fan may be first reduced, and the system energy-saving controller obtains the power demand value after the rotation speed of the fan is reduced through the serial bus.

The order of steps 603, 604, and 605 may be randomly changed, which does not affect the implementation of the embodiments of the present invention. Steps 603, 604, and 605 may be output to the register inside the power energy-saving control logical unit, and the register may separately store the power values of the PSUs, the service boards, and the cooling units in the communication equipment.

In step 606, the power energy-saving control logical unit determines, according to the calculated total power demand value of the boards, the total power demand value of the cooling units, and the obtained rated output power of each PSU, the number of the PSUs currently required to be turned on in the communication equipment.

In step 607, the power energy-saving control logical unit adjusts the current number of the system PSUs actually turned on to the determined number of PSUs required to be turned on.

That is, the power energy-saving control logical unit turns off PSUs in the communication equipment other than the determined number of the PSUs required to be turned on or enable them to sleep, and the power energy-saving control logical unit controls the system PSUs through hardware control logic without software interference, so as to achieve a high speed.

In this embodiment of the present invention, in the case that the PSU modules in the communication equipment are not changed, the system power is dynamically controlled through the hardware control logic, thereby improving the energy efficiency of the equipment and reducing the power consumption.

Embodiment 5

Figure 8A:
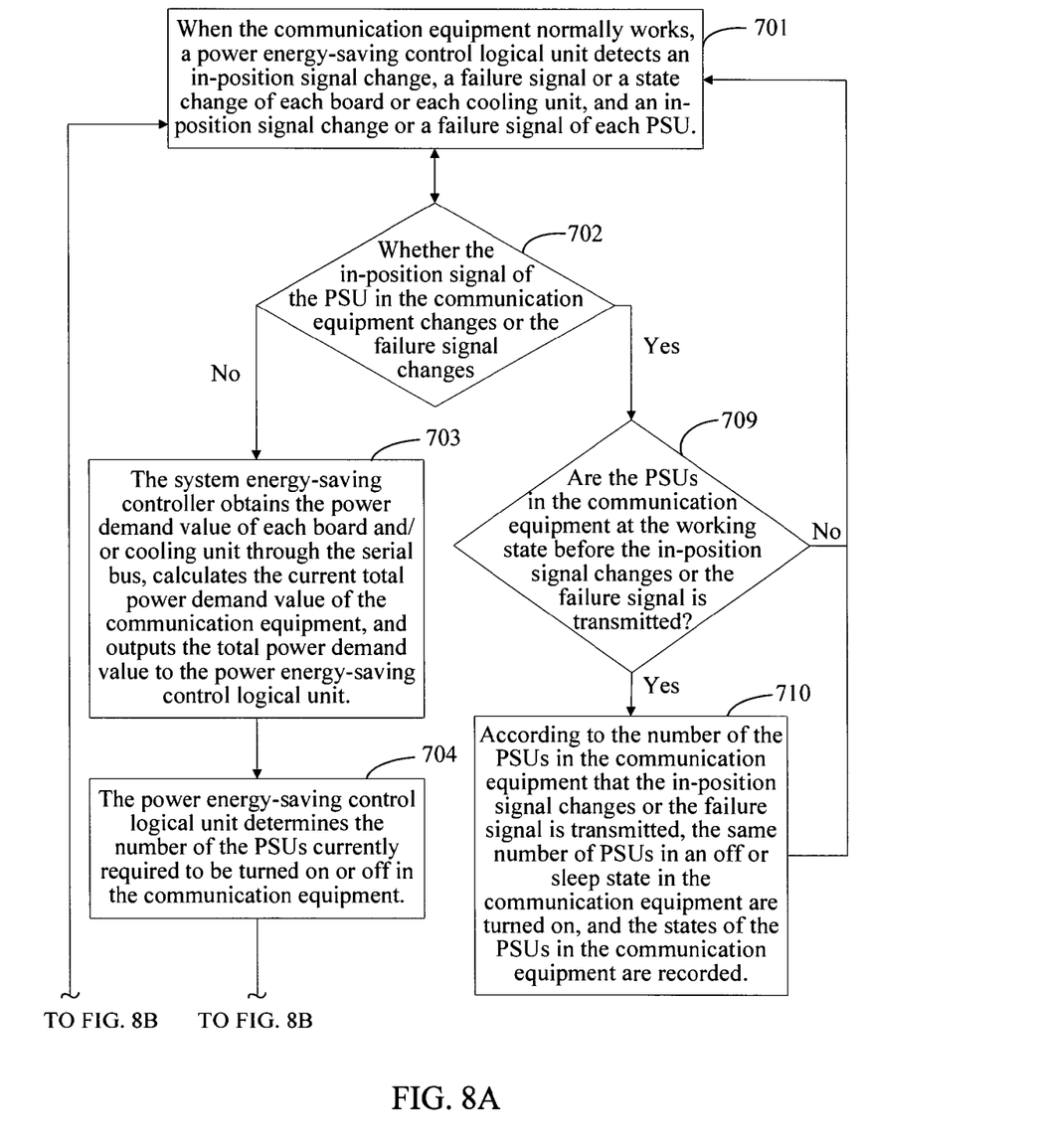
FIG. 8 is a schematic flowchart of a method according to Embodiment 5 of the present invention.
Figure 8B:
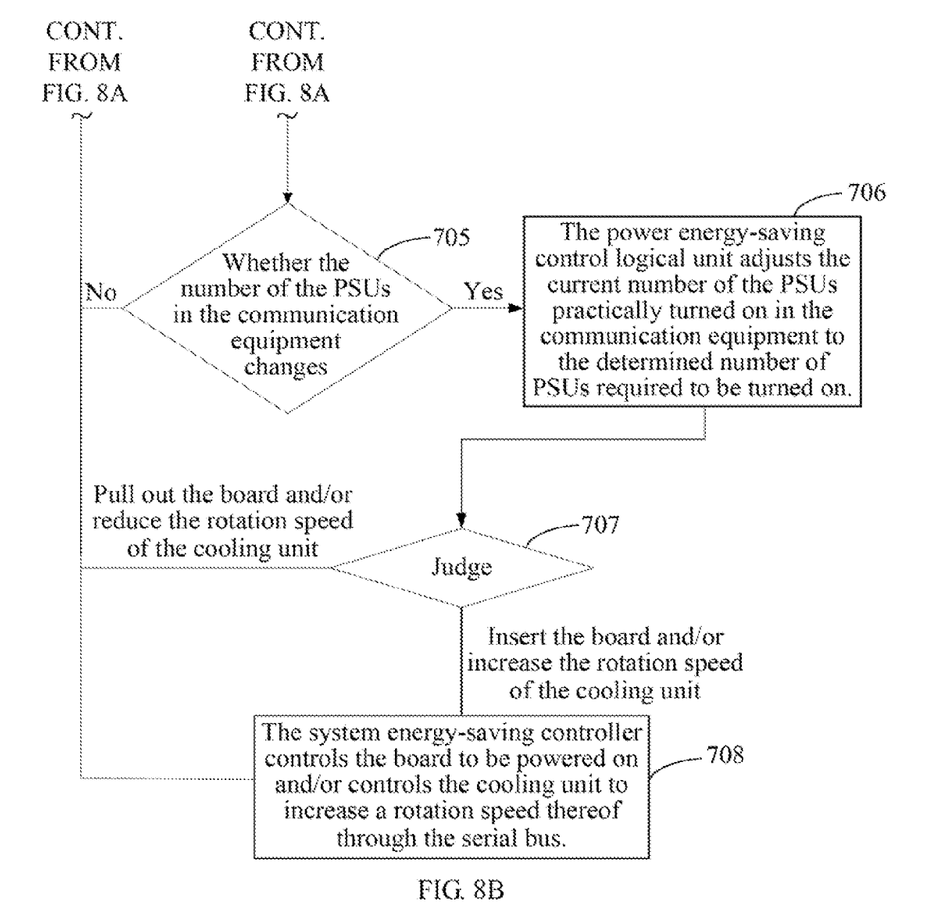

FIG. 8 is a schematic flow chart of a method according to an embodiment of the present invention. Referring to FIG. 8, the modules, for example, are a board and a cooling unit, and the method includes the following steps.

In step 701, when communication equipment works normally, a power energy-saving control logical unit detects an in-position signal change, a failure signal or a state change of each board and each cooling unit, and an in-position signal change or a failure signal of each PSU.

The in-position signal change indicates that the in-position signal exists when the board, the cooling unit, and the PSU are connected to the communication equipment, and the in-position signal does not exist when the board, the cooling unit, and the PSU are removed from the communication equipment.

The state change of the cooling unit includes the change of the rotation speed of the cooling unit.

In step 702, it is detected whether the in-position signal or the failure signal of the PSU in the communication equipment changes; if the in-position signal or the failure signal of the PSU in the communication equipment changes, the process turns to step 709; and if neither the in-position signal nor the failure signal is detected, the process turns to step 703.

In step 703, the system energy-saving controller obtains the power demand values of the boards and/or the cooling units through the serial bus, and calculates the total power demand value of the current communication equipment and outputs the total power demand value to the power energy-saving control logical unit.

It should be noted that when the system energy-saving controller obtains the power demand values of the boards through the serial bus, the following cases may be included.

When the board is newly inserted, a power demand storage unit of the board is powered on (the board is not powered on at this time), and the system energy-saving controller 21 may obtain the power demand value of the board through the serial bus; and when the board is pulled out, the power energy-saving control logical unit may judge, according to the in-position signal of the board, that the board is pulled out, and the system energy-saving controller may obtain through the serial bus that the board does not have power demand.

If the cooling unit is a fan, when the system energy-saving controller obtains the power demand values of the boards through the serial bus, the following two cases may be included.

When the rotation speed of the fan increases, the system energy-saving controller updates the power demand register value of the cooling unit in the power energy-saving control logical unit through the serial bus; and when the rotation speed of the fan decreases, the rotation speed of the fan may be first reduced, and the system energy-saving controller obtains the power demand value after the rotation speed of the fan is reduced through the serial bus.

In step 704, the power energy-saving control logical unit determines the number of the PSUs currently required to be turned on or off in the communication equipment.

Turning off the PSUs in the communication equipment or making the system PSU sleep.

In step 705, it is judged whether the number of the PSUs in the communication equipment changes or not; if yes, the process turns to step 706; and otherwise, the process turns to step 701.

In step 706, the power energy-saving control logical unit adjusts the current number of the PSUs actually turned on in the communication equipment to the determined number of PSUs required to be turned on, and then the process turns to step 707.

In step 707, it is judged what changes occur in the board and/or the cooling unit in the communication equipment, and when the board is pulled out from the communication equipment and/or the rotation speed of the cooling unit is reduced, the process turns to step 701; and when the board is inserted in the communication equipment and/or the rotation speed of the cooling unit is increased, the process turns to step 708.

In step 708, the system energy-saving controller controls the board to be powered on and/or controls the cooling unit to increase the rotation speed of the cooling unit through the serial bus.

The output unit 213 of the system energy-saving controller 21 may control the board to be powered on and/or control the cooling unit to increase the rotation speed of the cooling unit.

In step 709, are the PSUs in the communication equipment at the working state before the in-position signal changes or the failure signal is transmitted? If yes, step 710 is performed; otherwise, the process turns to step 701.

In step 710, a number of the PSUs in the communication equipment that the in-position signal changes or the failure signal is transmitted, a same number of PSUs in the communication equipment in an off or sleep state are turned on, and the states of the PSUs in the communication equipment are recorded.

In this embodiment of the present invention, in the case that the PSU modules in the communication equipment are not changed, the system power may be dynamically controlled through the hardware control logic, thereby improving the energy efficiency of the equipment and reducing the power consumption.

It can be understood that, the communication equipment in the foregoing description may be a telecom equipment, or an IT equipment, and information interaction may be performed inside the communication equipment or between the equipments, and the present invention is not limited in this aspect.

It should be noted that, the foregoing method embodiments are described as a series of action combination for the purpose of brief description, but it should be understood by persons skilled in the art that, the present invention is not limited to the action order in the description, because some steps may adopt other orders or are simultaneously performed according to the present invention. In addition, it should also be understood by persons skilled in the art that, the embodiments in the description are all preferred embodiments, and the involved actions or modules are not necessarily required by the present invention.

In the foregoing embodiments, the description of the embodiments has their own particular emphasis respectively, and as for a part which is not described in detail in a certain embodiment, reference can be made to the related description in other embodiments.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be a magnetic disk, an optical disk, a read-only memory (ROM) or a random access memory (RAM).

The power management method and apparatus and the power supply system according to embodiments of the present invention are described in detail above. The principles and implementation of the present invention are described herein through specific examples. The description about the embodiments of the present invention is merely provided for ease of understanding of the method and core ideas of the present invention. Persons of ordinary skill in the art can make changes to the present invention in terms of the specific implementations and application scopes according to the ideas of the present invention. Therefore, the specification shall not be construed as a limit to the present invention.

What is claimed is:
1. A power management method, comprising:
obtaining, by a system energy-saving controller, a power demand value of each module and a rated output power of each power supply unit (PSU) in a communication equipment;
calculating, by the system energy-saving controller, a total power demand value of the communication equipment based at least in part on the power demand values of the modules in the communication equipment;
determining, by hardware control logic adopted by a power energy-saving control logical unit, a number of PSUs currently required to be turned on in the communication equipment, wherein the number of PSUs currently required is equal to the total power demand value of the communication equipment divided by the rated output power of each PSU in the communication equipment when the total power demand value of the communication equipment divided by the rated output power of each PSU in the communication equipment is equal to an integer, and wherein the number of PSUs currently required is equal to a sum of one and an integer portion of the total power demand value of the communication equipment divided by the rated output power of each PSU in the communication equipment when the total power demand value of the communication equipment divided by the rated output power of each PSU in the communication equipment is not equal to the integer; and
adjusting, by the power energy-saving control logical unit, a current number of the PSUs actually turned on in the communication equipment to the determined number of PSUs currently required to be turned on in the communication equipment.

2. The method according to claim 1, wherein obtaining the power demand value of each module in the communication equipment comprises obtaining the power demand value of each module in the communication equipment according to a configuration condition and a state of each module.

3. The method according to claim 2, wherein each module comprises a board and a cooling unit, and wherein obtaining the power demand value of each module in the communication equipment according to the configuration condition and the state of each module comprises:
 obtaining the power demand value of each board according to an in-position signal of each board and a type of each board or a power demand value of each board in a power demand storage unit of each board; and
 obtaining a power demand value of each cooling unit according to an in-position signal of each cooling unit and a change of a rotation speed of the cooling unit.

4. The method according to claim 2, wherein each module comprises a board, and wherein obtaining the power demand value of each module in the communication equipment according to the configuration condition and the state of each module comprises:
 obtaining the power demand value of each board according to an in-position signal of each board and a type of each board; and
 obtaining the power demand value of each board according to a power demand value of each board in a power demand storage unit of each board.

5. The method according to claim 1, further comprising:
 detecting an in-position signal or a failure signal of the PSU; and
 controlling a turn-on and a turn-off of each PSU according to the detected signal by instantly turning on one of the PSUs that is in a sleep state or in an off state when detecting that a failure occurs in a normally working PSU or that the normally working PSU is pulled out.

6. The method according to claim 1, wherein the power energy-saving control logical unit further comprises:
 a state detection unit configured to detect an in-position signal or a failure signal of each module and each PSU; and
 an adjustment unit configured to control the turn-on and the turn-off of each PSU according to the signal detected by the state detection unit by instantly turning on one of the PSUs that is in a sleep state or in an off state when the state detection unit detects that a failure occurs in a normally working PSU or that the normally working PSU is pulled out.

7. The method according to claim 1, wherein the communication equipment comprises multiple partitions, wherein each partition comprises one of the PSUs and one of the modules, wherein the PSU in each partition supplies power to the one of the modules in the partition, and wherein the system energy-saving controller separately and independently controls each of the partitions of the communication equipment.

8. A power management apparatus, comprising:
 a system energy-saving controller configured to obtain a power demand value of each module and a rated output power of each power supply unit (PSU) in a communication equipment, calculate a total power demand value of the communication equipment based at least in part on the power demand values of the modules in the communication equipment, and output the total power demand value of the communication equipment and the rated output power of each PSU; and
 a power energy-saving control logical unit configured to adjust, according to the total power demand value of the communication equipment and the rated output power of each PSU output by the system energy-saving controller, a current number of the PSUs actually turned on in the communication equipment,
 wherein the power energy-saving control logical unit is configured to determine a number of PSUs currently required to be turned on in the communication equipment,
 wherein the number of PSUs currently required is equal to the total power demand value of the communication equipment divided by the rated output power of each PSU in the communication equipment when the total power demand of the communication equipment divided by the rated output power of each PSU in the communication equipment is equal to an integer,
 wherein the number of PSUs currently required is equal to a sum of one and an integer portion of the total power demand value of the communication equipment divided by the rated output power of each PSU in the communication equipment when the total power demand value of the communication equipment divided by the rated output power of each PSU in the communication equipment is not equal to the integer, and
 wherein the power energy-saving control logical unit is configured to adjust the current number of the PSUs actually turned on in the communication equipment to the determined number of PSUs currently required to be turned on in the communication equipment.

9. The apparatus according to claim 8, wherein the system energy-saving controller comprises:
 an obtaining unit configured to obtain the power demand value of each module and the rated output power of each PSU in the communication equipment;
 a calculation unit configured to calculate the total power demand value of the communication equipment according to the power demand value of each module obtained by the obtaining unit; and
 an output unit configured to output the total power demand value of the communication equipment calculated by the calculation unit and the rated output power of each PSU obtained by the obtaining unit to the power energy-saving control logical unit.

10. The apparatus according to claim 9, wherein the output unit is further configured to control the modules, and wherein each module comprises a board and a cooling unit or each module comprises the board and no cooling unit.

11. The apparatus according to claim 9, wherein the power energy-saving control logical unit comprises:
 a storage unit configured to store the total power demand value of the communication equipment and the rated output power of each PSU output by the system energy-saving controller;
 a power number determination unit configured to determine, according to the total power demand value of the communication equipment and the rated output power of each PSU stored by the storage unit, the number of PSUs currently required to be turned on in the communication equipment; and
 an adjustment unit configured to adjust the current number of the PSUs actually turned on in the communication equipment to the determined number of PSUs currently required to be turned on in the communication equipment.

12. The power management apparatus according to claim 8, wherein each module comprises a board and a cooling unit, or wherein each module comprises the board and no cooling unit.

13. The apparatus according to claim 11, wherein the power energy-saving control logical unit further comprises a state detection unit configured to detect an in-position signal, a normal working signal, or a failure signal of each module and each PSU, wherein the adjustment unit controls the turn-on and the turn-off of each PSU according to the signal detected by the state detection unit, and wherein the adjustment unit controls the turn-on and the turn-off of each PSU according to the signal detected by the state detection unit by instantly turning on one of the PSUs that is in a sleep state or in an off state when the state detection unit detects that a failure occurs in a normally working PSU or that the normally working PSU is pulled out.

14. The apparatus according to claim 8, wherein the communication equipment comprises multiple partitions, wherein each partition comprises one of the PSUs and one of the modules, wherein the PSU in each partition supplies power to the one of the modules in the partition, and wherein the system energy-saving controller separately and independently controls each of the partitions of the communication equipment.

15. A power supply system, comprising:
a power management apparatus; and
modules and power supply units (PSUs) in communication equipment,
wherein the power management apparatus is configured to manage the PSUs,
wherein the PSUs are configured to supply power for the modules,
wherein the power management apparatus is configured to obtain a power demand value of each module and a rated output power of each PSU in the communication equipment, calculate a total power demand value of the communication equipment based at least in part on the power-demand values of the modules in the communication equipment, and adjust, according to the total power demand value of the communication equipment and the rated output power of each PSU, a current number of the PSUs actually turned on in the communication equipment,
wherein the power management apparatus a system energy-saving controller and a power energy-saving control logical unit,
wherein the system energy-saving controller is configured to obtain the power demand value of each module and the rated output power of each PSU in the communication equipment, calculate the total power demand value of the communication equipment, and output the total power demand value of the communication equipment and the rated output power of each PSU to the power energy-saving control logical unit,
wherein the power energy-saving control logical unit is configured to adjust, according to the total power demand value of the communication equipment and the rated output power of each PSU output by the system energy-saving controller, the current number of the PSUs actually turned on in the communication equipment,
wherein the power energy-saving control logical unit comprises a storage unit, a power number determination unit, and an adjustment unit,
wherein the storage unit is configured to store the total power demand value of the communication equipment and the rated output power of each PSU output by the system energy-saving controller,
wherein the power number determination unit is configured to determine, according to the total power demand value of the communication equipment and the rated output power of each PSU stored by the storage unit, the number of PSUs currently required to be turned on in the communication equipment,
wherein the adjustment unit is configured to adjust the current number of the PSUs actually turned on in the communication equipment to the determined number of PSUs currently required to be turned on in the communication equipment,
wherein the number of PSUs currently required is equal to the total power demand value of the communication equipment divided by the rated output power of each PSU in the communication equipment when the total power demand of the communication equipment divided by the rated output power of each PSU in the communication equipment is equal to an integer, and
wherein the number of PSUs currently required is equal to a sum of one and an integer portion of the total power demand value of the communication equipment divided by the rated output power of each PSU in the communication equipment when the total power demand value of the communication equipment divided by the rated output power of each PSU in the communication equipment is not equal to the integer.

16. The system according to claim 15 wherein the system energy-saving controller comprises:
an obtaining unit configured to obtain the power demand value of each module and the rated output power of each PSU in the communication equipment;
a calculation unit configured to calculate the total power demand value of the communication equipment; and
an output unit configured to output the total power demand value of the communication equipment obtained by the calculation unit and the rated output power of each PSU obtained by the obtaining unit to the power energy-saving control logical unit.

17. The system according to claim 16, wherein the output unit is further configured to control the modules, and wherein each module comprises a board and a cooling unit or each module comprises the board and no cooling unit.

18. The system according to claim 15, wherein the communication equipment comprises multiple partitions, wherein each partition comprises one of the PSUs and one of the modules, wherein the PSU in each partition supplies power to the one of the modules in the partition, and wherein the system energy-saving controller separately and independently controls each of the partitions of the communication equipment.

* * * * *

UNITED STATES PATENT AND TRADEMARK OFFICE
CERTIFICATE OF CORRECTION

PATENT NO. : 8,621,252 B2
APPLICATION NO. : 13/211801
DATED : December 31, 2013
INVENTOR(S) : Qingyin Fang

It is certified that error appears in the above-identified patent and that said Letters Patent is hereby corrected as shown below:

In the Claims

Column 17/Line 46, Claim 15 should read: "wherein the power management apparatus comprises a system"

Column 18/Line 37, Claim 16 should read: "The system according to claim 15, wherein the system"

Signed and Sealed this
Eleventh Day of March, 2014

Michelle K. Lee
*Deputy Director of the United States Patent and Trademark Office*